(12) United States Patent
Van der Tol

(10) Patent No.: US 9,075,197 B2
(45) Date of Patent: Jul. 7, 2015

(54) INCREASED TOLERANCE POLARIZATION CONVERTERS

(71) Applicant: Technische Universiteit Eindhoven, Eindhoven (NL)

(72) Inventor: Johannes Jacobus Gerardus Van der Tol, Helmond (NL)

(73) Assignee: Technische Universiteit Eindhoven, Eindhoven (NL)

( * ) Notice: Subject to any disclaimer, the term of this patent is extended or adjusted under 35 U.S.C. 154(b) by 0 days.

(21) Appl. No.: 14/360,989

(22) PCT Filed: Nov. 30, 2012

(86) PCT No.: PCT/EP2012/074137
§ 371 (c)(1),
(2) Date: May 28, 2014

(87) PCT Pub. No.: WO2013/083493
PCT Pub. Date: Jun. 13, 2013

(65) Prior Publication Data
US 2014/0321797 A1    Oct. 30, 2014

Related U.S. Application Data

(60) Provisional application No. 61/630,120, filed on Dec. 5, 2011.

(51) Int. Cl.
G02B 6/00     (2006.01)
G02B 6/27     (2006.01)
G02B 6/126    (2006.01)

(52) U.S. Cl.
CPC ............ *G02B 6/27* (2013.01); *G02B 6/274* (2013.01); *G02B 6/2766* (2013.01); *G02B 6/126* (2013.01)

(58) Field of Classification Search
CPC .......... G02B 6/126; G02B 6/27; G02B 6/274; G02B 6/2766
USPC ............................... 385/11; 359/618; 398/152
See application file for complete search history.

(56) References Cited

U.S. PATENT DOCUMENTS 5,539,845 A    7/1996    van der Tol

OTHER PUBLICATIONS

Deng et al., "Design rules for slanted-angle polarization rotators," Lightwave Technology, Journal of, vol. 23, No. 1, pp. 432,445, Jan. 2005.*
Huang et al., "Realization of a Compact and Single-Mode Optical Passive Polarization Converter", IEEE Photonics Technology Letters, vol. 12, No. 3, p. 317, (2000).*

(Continued)

*Primary Examiner* — Peter Radkowski
(74) *Attorney, Agent, or Firm* — Lumen Patent Firm

(57) ABSTRACT

An optical polarization converter device includes a first polarization converter section [1100] and a second polarization converter section [1102], which have mirror image cross-sections of each other and which are made of a common material and have orientation (i.e., tilt) errors equal in magnitude and opposite in sign. Preferably, one section has half, the other one and a half times the length of an original (single section, non-tolerant) polarization converter, i.e., the lengths of the two sections have a ratio of 1:3. Other embodiments include length ratios of 3:5 and 5:7. In addition to correcting fabrication errors, the polarization converter also corrects errors due to temperature and wavelength, improving the tolerance with respect to operational conditions.

6 Claims, 18 Drawing Sheets

(56) References Cited

OTHER PUBLICATIONS

Obayya et al., "Beam Propagation Modeling of Polarization Rotation in Deeply Etched Semiconductor Bent Waveguides", IEEE Photonics Technology Letters, vol. 13, No. 7, p. 681, (2001).*

Tzolov et al, "Modeling of a Passive Polarization Converter Free of Longitudinally-Periodic Structure," in Integrated Photonics Research, vol. 6 of 1996 OSA Technical Digest Series (Optical Society of America, 1996), paper IMH12.*

Deng et al. (2005). Design Rules for Slanted-Angle Polarization Rotators. Journal of Lightwave Technology, 23(1):432-445.

van der Tol et al. (2012). Increasing Tolerance in Passive Integrated Optical Polarization Converters. Journal of Lightwave Technology, 30(17):2884-2889.

Tzolov et al. (1996). A passive polarization converter free of longitudinally-periodic structure. Optics Communications 127:7-13.

* cited by examiner

INCREASED TOLERANCE POLARIZATION CONVERTERS

CROSS-REFERENCE TO RELATED APPLICATIONS

This application is a 371 of PCT/EP2012/074137 filed on Nov. 30, 2012. PCT/EP2012/074137 claims the benefit of U.S. Provisional Application 61/630,120 filed on Dec. 5, 2011.

FIELD OF THE INVENTION

The present invention relates generally to optical devices. More specifically, it relates to polarization converters used in photonics integrated circuits.

BACKGROUND OF THE INVENTION

Integration of optical functions into photonic integrated circuits (PICs or "optical chips") is a developing technology attracting increasing attention by researchers. In PICs optical functionality is created by bringing together basic optical components. One of these components is the polarization converter (or polarization rotator), which is used to control the state of polarization of light in a chip. This is important because the planar geometry typically results in polarization dependent operation, and because some applications are polarization based (e.g., polarization multiplexing in telecom applications). Polarization manipulation in PICs is also important for polarization independent operation of the integrated circuit chips, and for functionalities like polarization multiplexing and polarization switching. An ideal polarization converter would be a short low-loss passive component, which can be realized within the standard fabrication of a PIC. However, it still remains an unsolved challenge to realize such an ideal.

A number of proposals have been made for polarization converters. The most promising of these proposals seems to be the sloped sidewall devices, which operate as an integrated optical analogue of a half-wave plate. The tolerances to obtain an acceptable level of conversion, however, are relatively narrow. For example, the width deviations should be kept below 50 nm for conversion efficiency above 95%.

Thus, due to their tight fabrication tolerances, polarization converters known in the art are not adequate to make them commercially attractive.

SUMMARY OF THE INVENTION

The present invention provides polarization converters that have improved fabrication tolerances. The inventor has discovered the root of the intolerances in prior devices and how fabrication errors can be compensated in novel two-section polarization converter designs. The new devices double the fabrication tolerances and wavelength range and promises conversion efficiencies above 99%.

The inventor has discovered that the main reason for the limited tolerance of prior polarization converters lies in the difficulty to control the polarization states (also referred to herein as polarized modes of the waveguide) in the device, resulting in an orientation error of these states. For example, prior waveguide polarization converters often rely on waveguides modes having polarization states that are at ±45 degrees with respect to the input and output polarization states being converted. In practice, performance of such polarization converters has been found to be dominated by deviations from this ±45 degrees condition (i.e., a tilt error). These deviations can result from non-ideal fabrication. Thus, the effect of fabrication on this angular error is the dominant source of fabrication-induced performance variation for polarization converters.

To overcome these problems, the present invention provides a novel polarization converter design that combines a conventional converter section with a mirror-imaged cross section. Consequently, an orientation error of the same magnitude, but with the opposite sign is obtained. In other words, a polarization converter including two sections, which are each other's mirror image, will compensate the orientation error. The two sections are preferably made in the same fabrication, in the same material, and operate at the same temperature, and optical wavelength. Consequently, they will have the same magnitude of the fabrication error.

The present invention provides an optical polarization converter device comprising a first polarization converter section, and a second polarization converter section; where the first polarization converter section and second polarization converter section have mirror image cross-sections of each other; and where the first polarization converter section and second polarization converter section are made of a common material and have orientation (i.e., tilt) errors equal in magnitude and opposite in sign. The invention also encompasses photonic integrated circuits comprising such optical polarization converter devices.

In a preferred embodiment of a polarization converter according to the present invention, one section has half, the other one and a half times the length of an original (single section, non-tolerant) polarization converter, i.e., a ratio of 1:3. If $L_0$ is the length of a single section polarization converter, then the corresponding lengths in the compensated polarization converter are $L_1=0.5\ L_0$ and $L_2=1.5\ L_0$. So, in total, the device length is doubled. Apart from corrections to fabrication errors, the new device is also correcting errors due to temperature and wavelength, implying that also the tolerance with respect to operational conditions is much improved.

In other embodiments, the first polarization converter section and second polarization converter section may have other lengths. For example, in some embodiments, they have lengths in the ratio of 3:5 or 5:7. For example, $L_1=1.5\ L_0$ and $L_2=2.5\ L_0$, or $L_1=2.5\ L_0$ and $L_2=3.5\ L_0$. More generally, in embodiments of the invention the first polarization converter section and second polarization converter section may have lengths $L_1$ and $L_2$, respectively, where $L_1=(M+0.5)L_0$, $L_2=(N+0.5)L_0$, $|M-N|=2m+1$, for non-negative integers M,N,m. All of these configurations correct the tilt error. Because the phase error is not corrected, however, and its effect increases with total device length, the preferred embodiment is that having the minimal length that corrects the tilt error. Preferably, the device is constructed such that $\Delta\phi$ is less than 0.2 radians, where $\Delta\phi$ is a phase shift error between modes after propagation along a length of $L_0$.

In some embodiments, the first polarization converter section and second polarization converter section have lengths $L_1(1+\Delta\phi/2\pi)$ and $L_2(1+\Delta\phi/2\pi)$, respectively, respectively, where $L_1=(M+0.5)L_0$, $L_2=(N+0.5)L_0$, $|M-N|=2m+1$, for non-negative integers M,N,m, and where $\Delta\phi$ is a constant. In such embodiments, $\Delta\phi$ is preferably less than 0.566 radians (for conversion efficiency of at least 98%), and more preferably less than 0.4 radians (for conversion efficiency of at least 99%).

DETAILED DESCRIPTION

To fully appreciate the innovative features of the present invention, this description begins with a discussion of the inventor's discoveries relating to the origin of the intolerances of polarization converter designs. Briefly, it is found that the difficulty lies in maintaining the polarization angle of the modes close enough to the optimal 45° condition. The description then discloses new polarization converter designs that correct for possible errors in this angle. Consequently, the new polarization converter designs are much more tolerant to fabrication errors, but also to ambient conditions and wavelength deviation. The tolerant converters make use of two sloped sidewall sections, whose cross sections are mirror images of each other. In one embodiment, the new device is doubled in length with respect to a conventional single section device.

Figure 1:
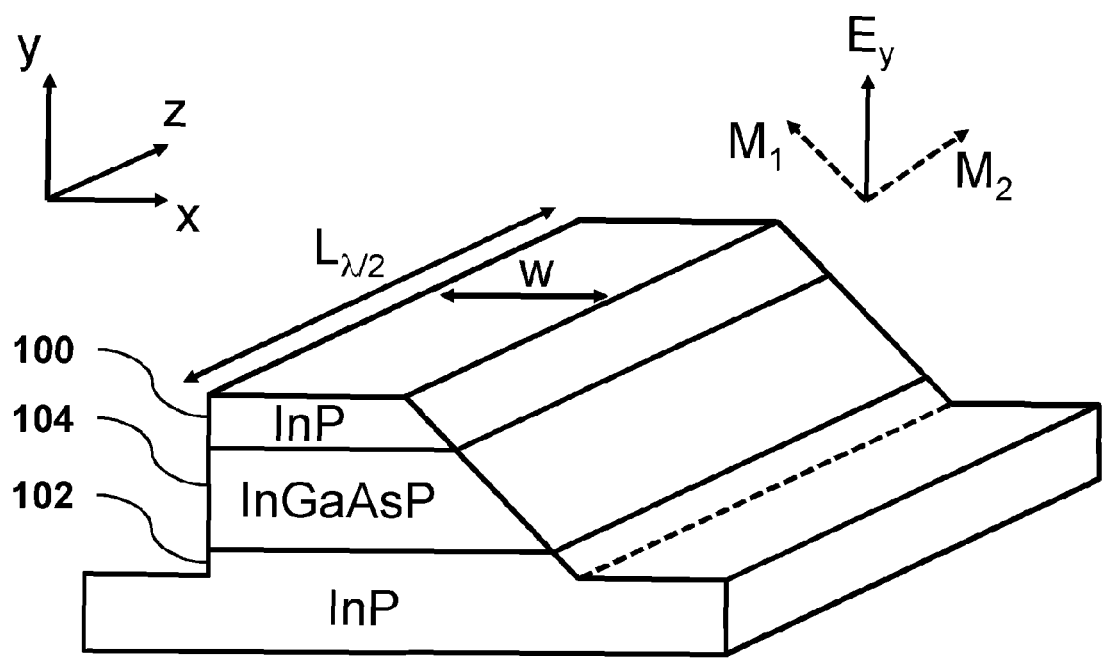
FIG. 1. View of a conventional single-section sloped sidewall polarization converter.

FIG. 1 shows a conventional polarization converter device having InP upper cladding layer 100, InP lower cladding layer 102, and InGaAsP core layer 104 sandwiched between them. In this device, polarization conversion of light propagating along the z-axis is obtained with a narrow waveguide having one slanted sidewall. Due to the electromagnetic boundary conditions, this design rotates the polarization of the modes. With a careful design, the rotation will be 45°. In that case a TE (or TM) mode from a symmetric input waveguide equally excites the two rotated orthogonal modes. These modes propagate with different propagation constants $\beta_1$ and $\beta_2$. After half of the beat length $L_{\lambda/2}=\pi/2|\beta_1-\beta_2|$ the rotated modes recombine to a TM (or TE) mode in a symmetric output waveguide. In this way full conversion between TE and TM is possible.

Figure 2:
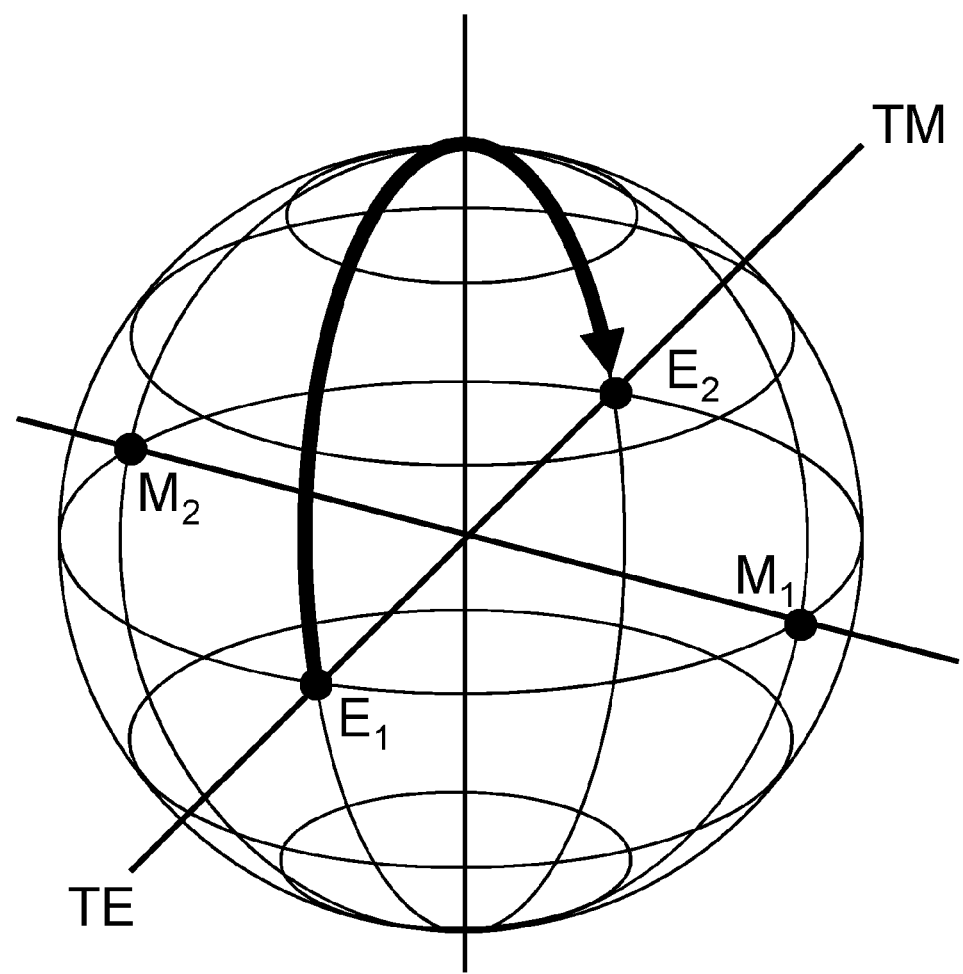
FIG. 2. The operation of a polarization converter depicted on the Poincaré sphere. $M_1$ and $M_2$ refer to the tilted modes.
Figure 3A:
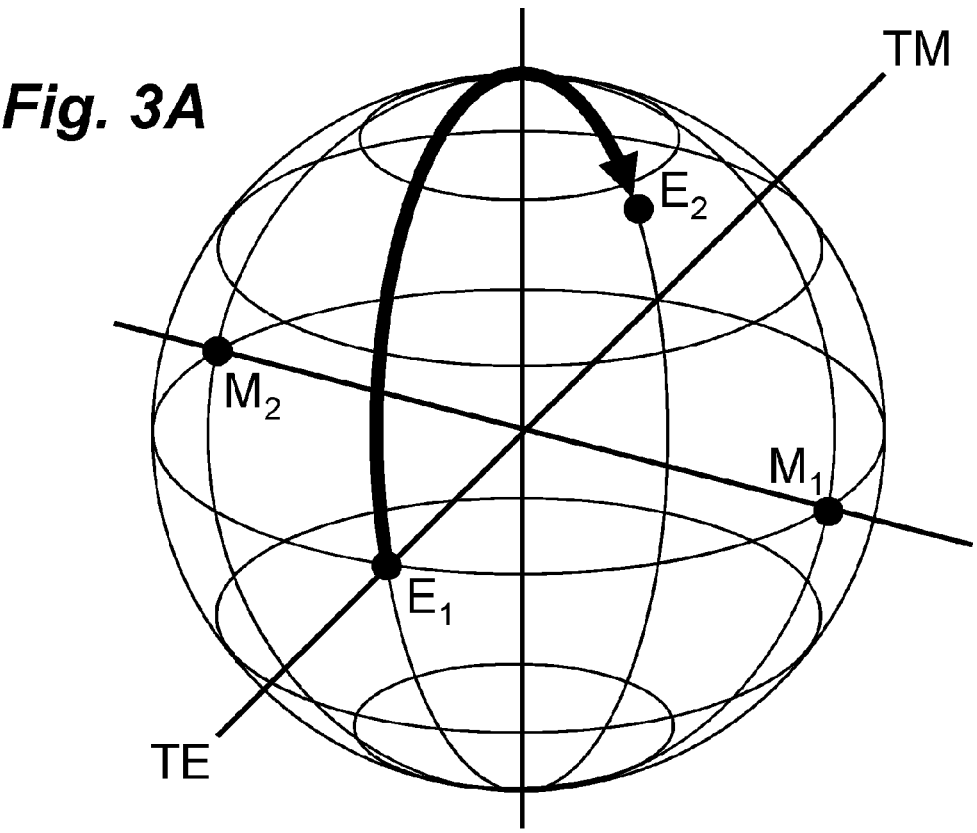
FIG. 3A, 3B. Graphs illustrating the operation of a polarization converter if the phase shift φ is different from π rad.
Figure 3B:
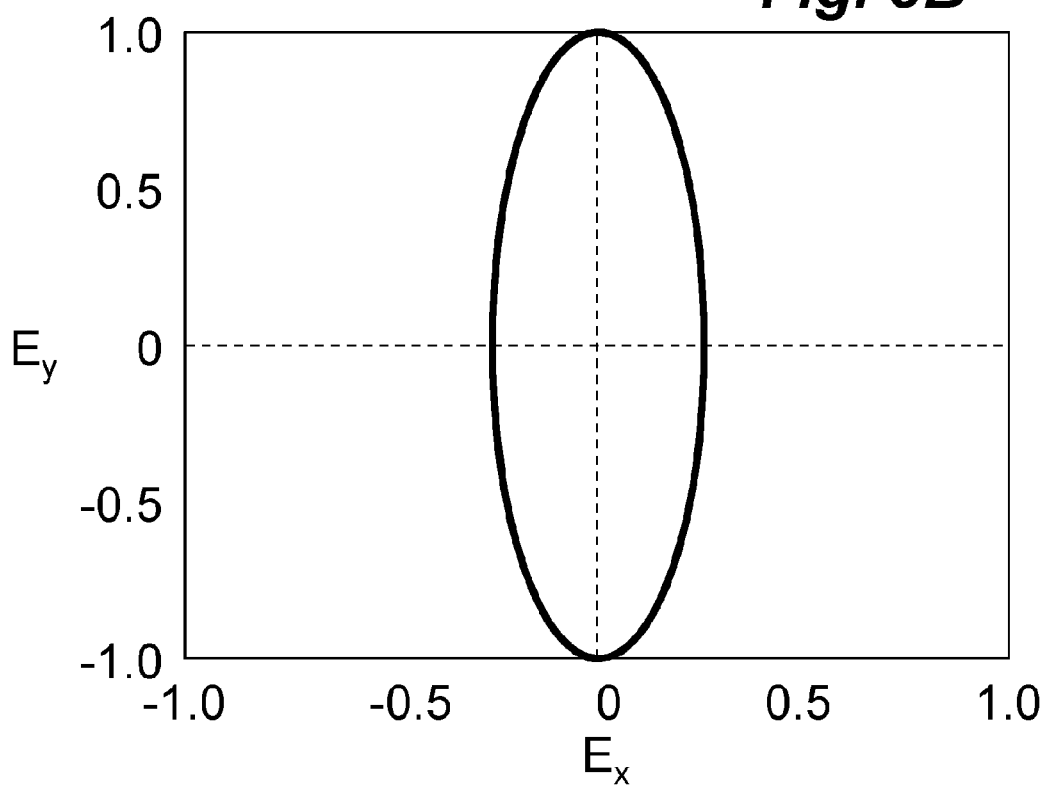
Figure 4A:
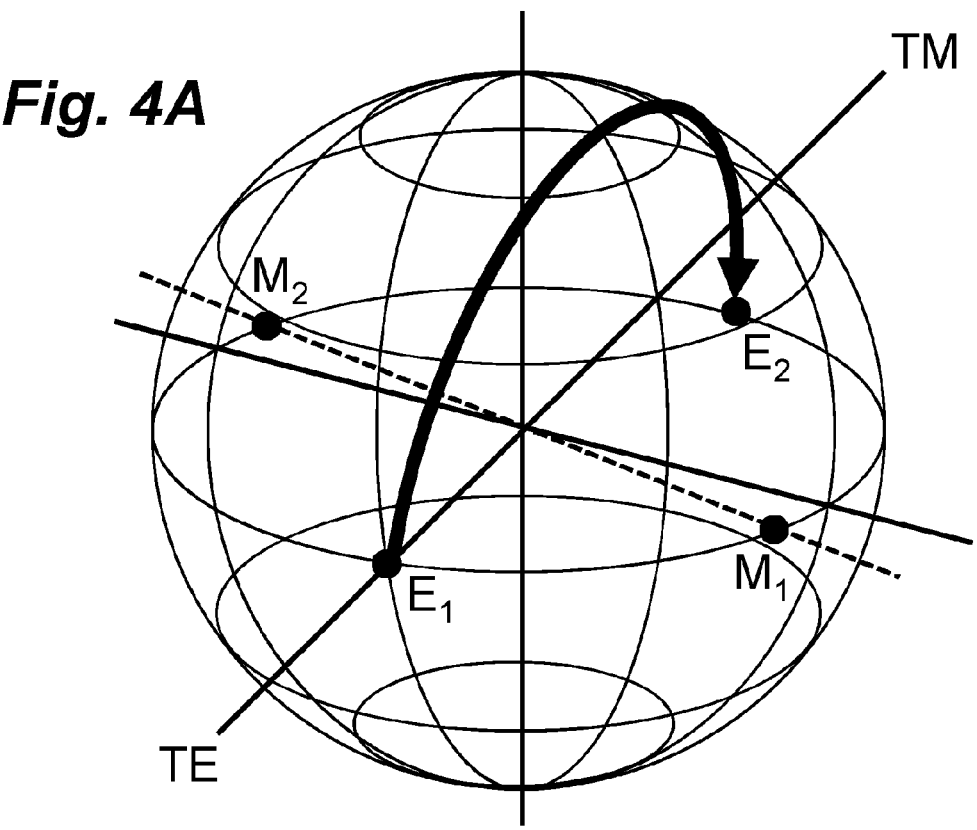
FIG. 4A, 4B. Graphs illustrating the operation of a polarization converter if the tilting angle Θ is different from π/4 rad.
Figure 4B:
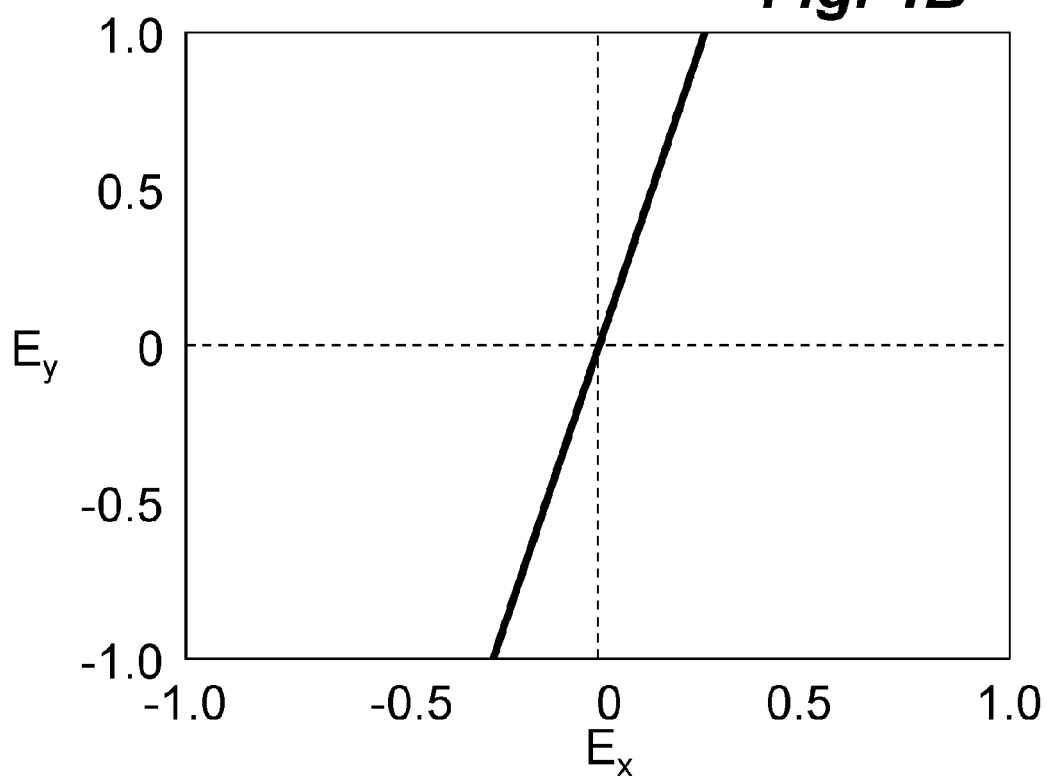

The operation of a polarization converter can be represented on the Poincaré sphere. Every possible state of polarization (SOP) is described by a point on the surface of this sphere, as illustrated in FIG. 2. The two intersections of the sphere with the x-axis are TE and TM points, the intersections of the sphere with the z-axis are left-handed and right-handed circular polarizations, and the intersection of the sphere with the y-axis, $M_1$ and $M_2$, are oppositely 45° tilted linear polarization modes. The polarization conversion from TE to TM corresponds to a rotation of π rad around an axis through the two stable polarization states in the converter section (which are ideally the oppositely 45° tilted linear polarizations). The rotation angle is the phase shift between the two modes in the converter. For a deviation of a realized polarization converter from the optimal design, two different errors can occur. The first is that the rotation (phase shift φ) is different from the required π rad. This is shown in FIG. 3. The result is an elliptical SOP. The second possible error is that the tilting angle Θ of the modes is different from 45° (π/4 rad). In that case the final SOP is linear, but it is rotated with respect to the TM polarization. This is illustrated in FIG. 4. Note that the linear polarization states are all on the equator of the Poincaré sphere. The relative importance of these two errors will be described next.

The conversion efficiency C of a polarization converter is given by the following formula:

$$C = P_{converted}/P_{total} = 2\cos^2\Theta \sin^2\Theta(1-\cos\phi) \quad (1)$$

where Θ is the tilting angle of the modes and $\phi=L(\beta_1-\beta_2)$ is the phase shift between them, where L is the length of the slanted section, and where $\beta_1$ and $\beta_2$ are the propagation constants. Propagation constants $\beta_1$ and $\beta_2$ describe the phase evolution of the modes in the waveguide. If the mode propagates along a length of L along the waveguide, its phase increases by βL. So for $L_0$, where we have $(\beta_1-\beta_2)L=\pi$, the two modes have accumulated a phase difference of π radians, which is why they recombine to the opposite output polarization, as illustrated in FIG. 1.

Clearly, from Eq. 1 it can be seen that for a perfect converter, Θ=π/4 and φ=π. If deviations ΔΘ and Δφ occur with respect to these respective values, due to fabrication errors, changes in operational conditions or differences in material parameters, the change ΔC in conversion is $$\Delta C = -4(\Delta\Theta)^2 - 0.25(\Delta\phi)^2. \quad (2)$$

Eq. 2 is obtained from a Taylor series expansion of Eq. 1. Since the first and third order terms in the expansion are zero, Eq. 2 is correct up to the fourth order.

Eq. 2 suggests that the effect of errors in the tilting angle is much worse than the effect due to comparable errors in the phase shift. Of course this will depend on the actual value of the deviations, but it will be shown in the next section, with simulations and general argumentation, that indeed the tilting angle deviation is dominant in reducing the conversion efficiency.

Figure 5:
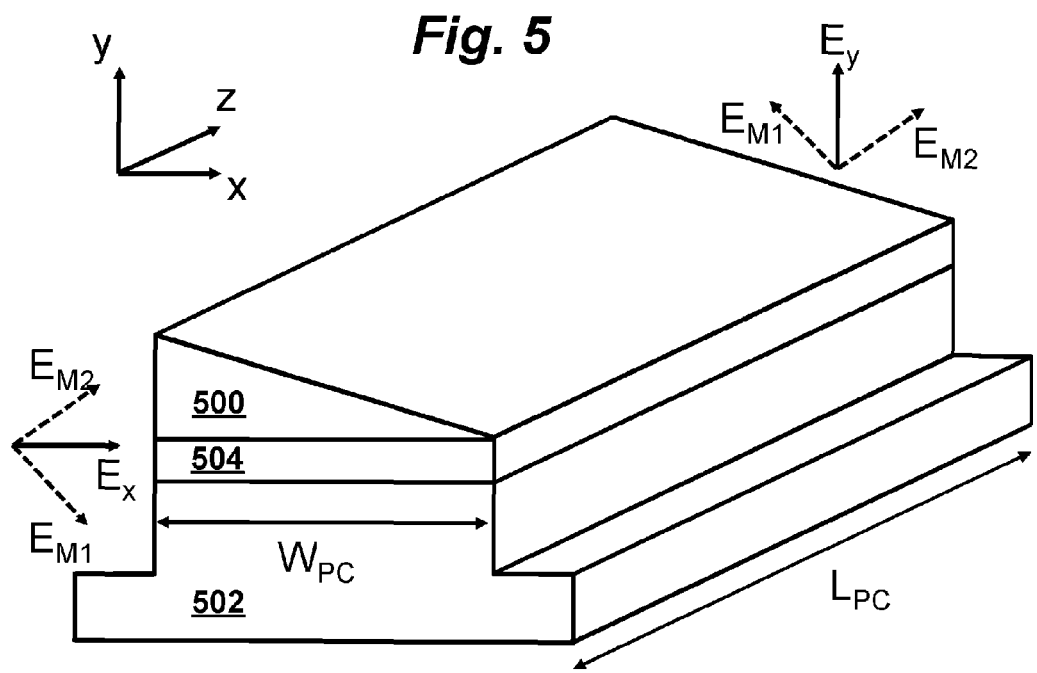
FIG. 5. View of a design of a conventional polarization converter.

The operation of a polarization converter was investigated using simulations with a model device structure as shown in FIG. 5. The device has an InP upper cladding layer 500, InP lower cladding layer 502, and InGaAsP core layer 504 sandwiched between them. In this converter the tilted modes are not obtained with a sloped sidewall, but with a triangular top cladding. This has certain advantages in the realization of the device. As will be discussed below, the results obtained for this converter are representative for all sloped sidewall polarization converters as well.

Figure 6:
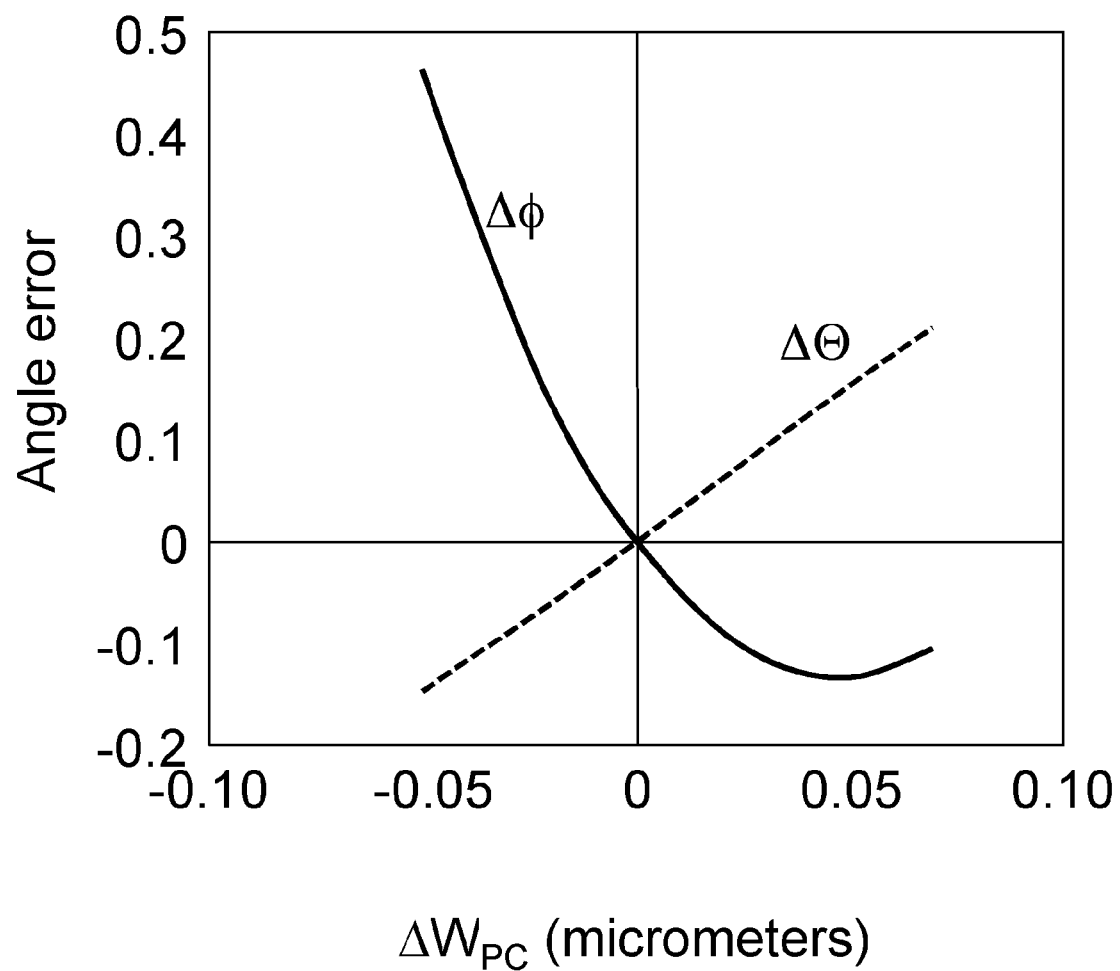
FIG. 6. Graph illustrating the dependence of the error in the tilt angle, ΔΘ, and the error in the phase shift, Δφ, as a function of width deviation $\Delta W_{PC}$ (in microns).

The first important issue is the relative impact of the two possible deviations; the error on the tilt angle $\Delta\Theta$ and the error on the phase shift $\Delta\phi$. Eq. 2 suggest that the former error is dominant, but to be sure we need to check the magnitude of both. By analyzing the modes in the polarization converter section with a film-mode-matching (FMM) waveguide solver, as a function of the width deviation, the values of $\Delta\Theta$ and $\Delta\phi$ may be determined, as shown in FIG. 6 which is a graph of the dependence of the error in the tilt angle, $\Delta\Theta$, and the error in the phase shift, $\Delta\phi$, as a function of width deviation $\Delta W_{PC}$ (in microns).

A linear dependence of $\Delta\Theta$ with width deviation $\Delta W_{PC}$ is found, but the phase shift $\Delta\phi$ has a quadratic dependence, leading to a minimum close to the design point for $W_{PC}$. As a consequence, for large negative values of $\Delta W_{PC}$, i.e., when the converter waveguide is much smaller than designed, we can expect that $\Delta\phi$ would become the dominant error (if $\Delta\phi$ is larger than 4 times $\Delta\Theta$, according to Eq. 2). However, in the region next to $\Delta W_{PC}=0$, and for positive $\Delta W_{PC}$ values, the tilting error clearly dominates.

This analysis raises the question if this behavior, with a minimum $\Delta\phi$ value close to the design width, is a general property of sloped sidewall polarization converters, or if it is a feature of this special design. Simulations on other designs show similar behavior, thus confirming the generality. This can be understood by considering the mechanism behind the tilting of the modes. The polarization of the modes is determined by the electromagnetic boundary conditions at the material interfaces of a waveguide cross section. Since most of these are either horizontal or vertical, TE- and TM-like modes are generally found. In the polarization converters one of the interfaces if placed under an angle, which results in an incentive for tilting of the modes. However, to overcome the effect of the other interfaces, so that the desired 45° tilting angle is obtained, hybridization of the TE and TM modes is needed. Such hybrid modes require that the propagation constants of the modes are close together, which is therefore a necessary condition for any polarization converter. Since the phase shift between the modes, when propagating along a length of waveguide, is proportional to the difference in the propagation constants, this implies that a minimum in the phase shift will be found close to the optimal design width of any sloped sidewall polarization converter. Based on this consideration a relatively wide width range can be expected in which the tilting angle error dominates the width tolerance.

Figure 7:
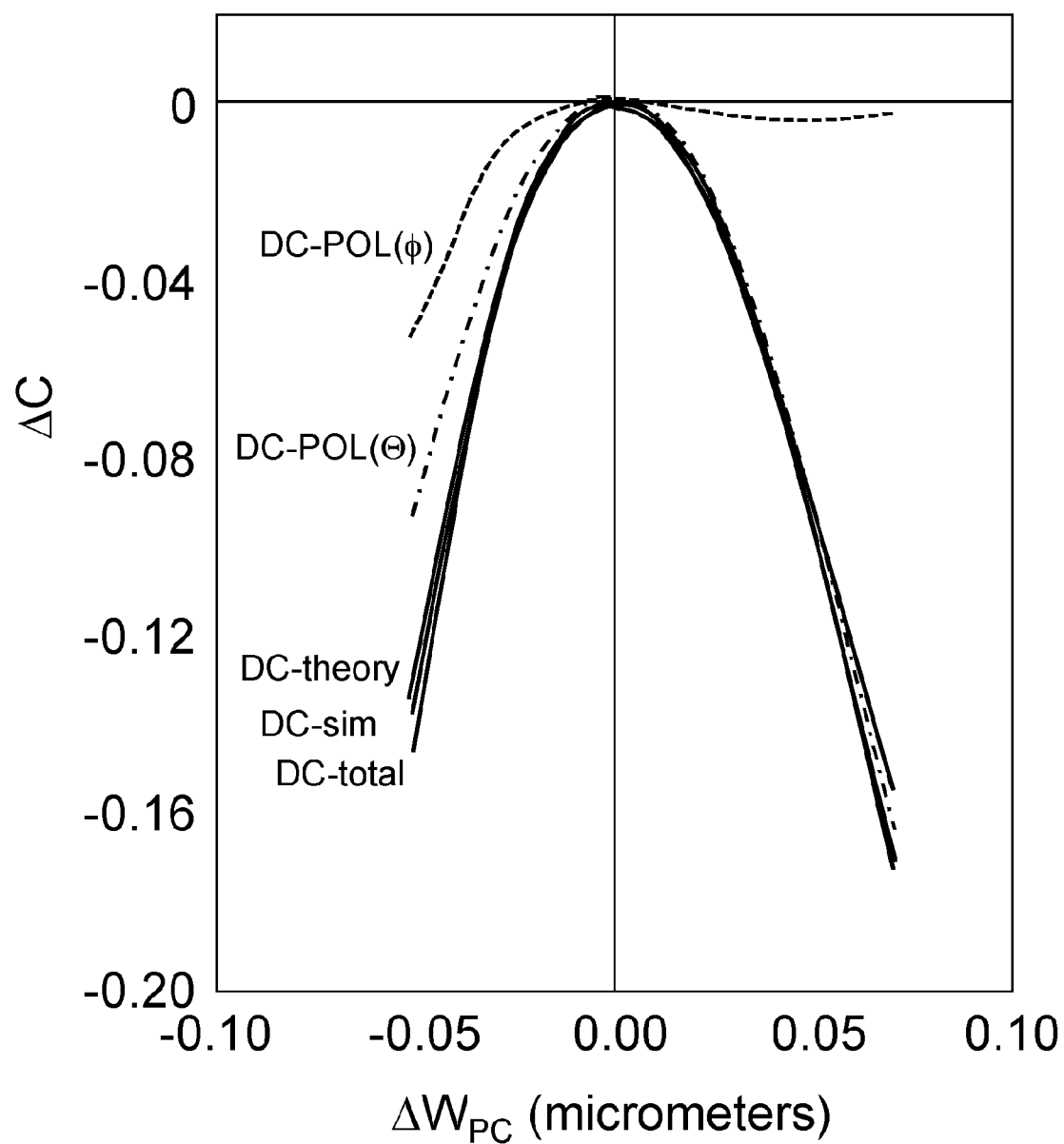
FIG. 7. Graph illustrating the change in conversion efficiency ΔC as a function of width deviation $\Delta W_{PC}$ (in microns), from contributions of the error on the tilt angle ΔΘ (DC-POL) and the error on the phase shift Δφ (DC-POL), as compared with the simulated (DC-sim) and theoretical (DC-Theory, according to eq. 1) values. DC-total is the combination of both error contributions.

FIG. 7 shows the effect of the two errors on the simulated conversion. It graphs the change in conversion efficiency $\Delta C$ as a function of width deviation $\Delta W_{PC}$ (in microns), from contributions of the error on the tilt angle $\Delta\Theta$ (DC-POL (Theta)) and the error on the phase shift $\Delta\phi$ (DC-POL(Phi)), as compared with the simulated (DC-sim) and theoretical (DC-Theory, according to Eq. 1) values. DC-total is the combination of both error contributions. This figure shows that simulation, theory and added error contributions (according to Eq. 2) are all very close together; underlining the validity of the analysis above. The contribution of the phase shift error $\Delta\phi$ is negligible, except for negative width deviations larger than 30 nm. Everywhere else the tilt angle error has a (much) larger impact.

Figure 8:
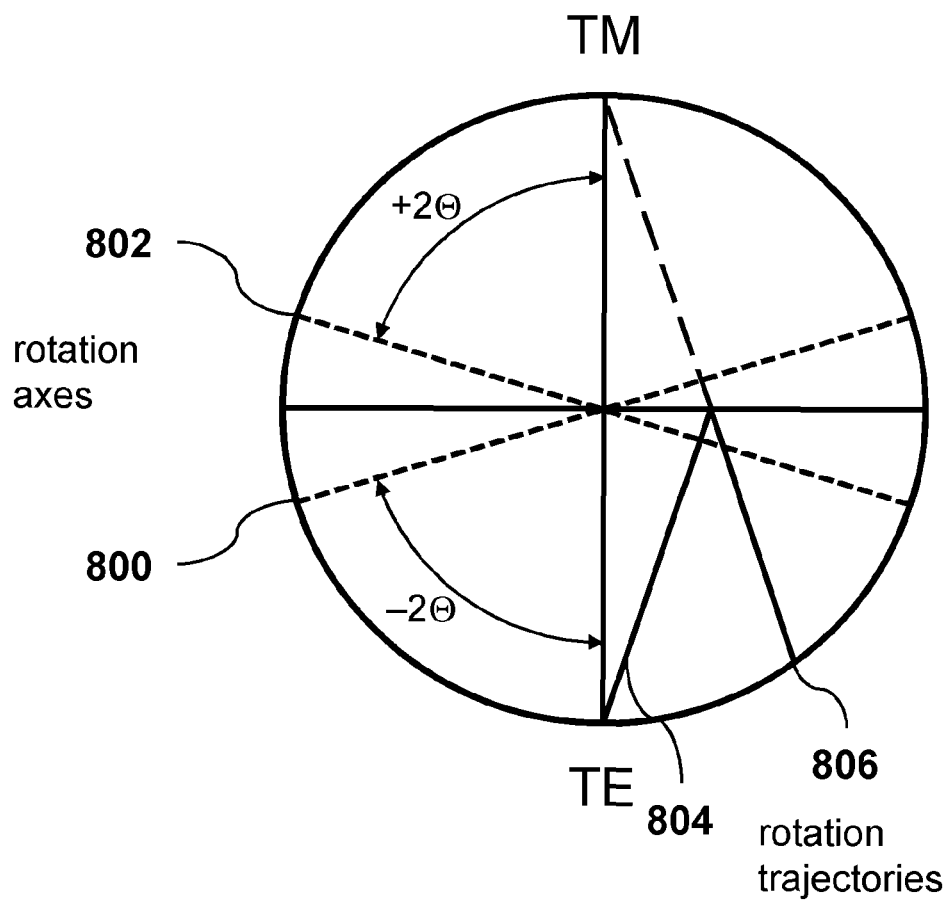
FIG. 8. Graph illustrating the projection on the equator plane of the Poincaré sphere. Red lines indicate the rotation axes, blue lines the rotation trajectories.
Figure 9A:
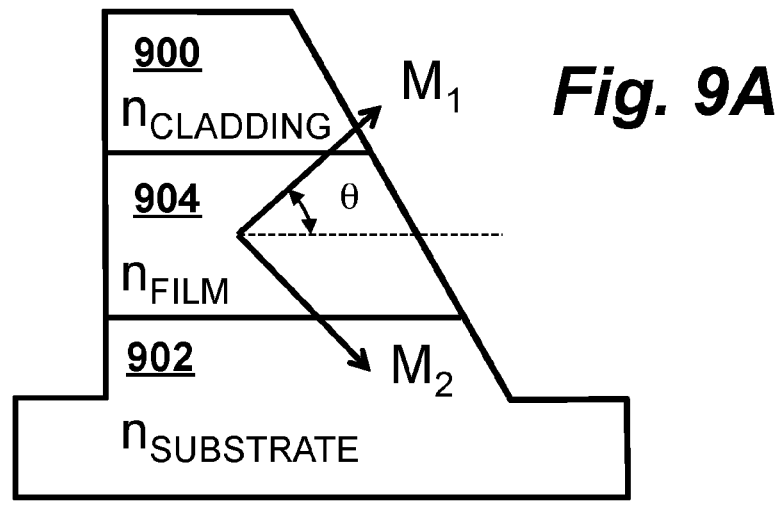
FIG. 9A, 9B. Illustrations of a mirrored cross section polarization converter which leads to tilting angle of the modes with reversed sign.
Figure 9B:
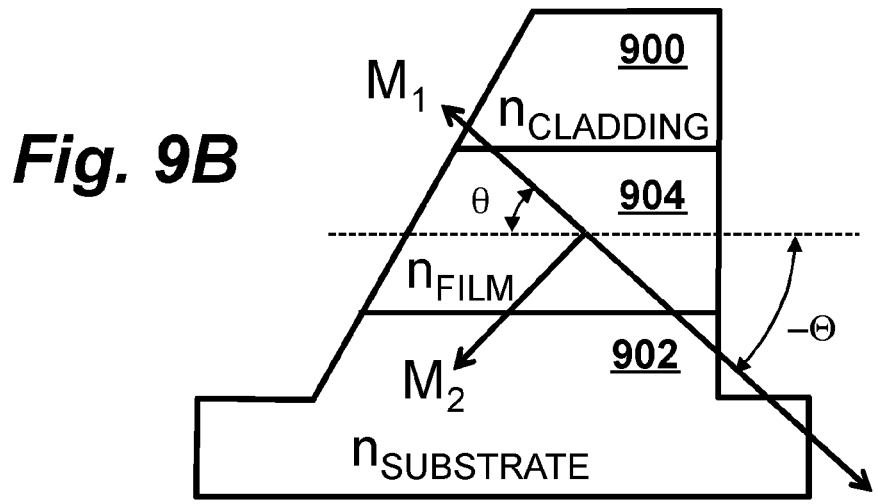

With the benefit of the analysis above, the inventor has discovered that improving the tolerance of the polarization converter requires a correction for especially the error in the tilting angle $\Theta$ that occurs due to deviations from the design. The diagram in FIG. 8 illustrates a possibility for this correction. The diagram shows a top view of the Poincaré sphere, with the polarization conversions indicated by the axes around which the rotation of the SOP takes place, and the rotation trajectories (which show up as straight lines 804 and 806 perpendicular to the rotation axes 800 and 802 in this projection). Here we will use the conversion from TE to TM as an example, but for the reverse conversion (TM to TE) everything is completely reciprocal. If we allow the rotation to go halfway, i.e., around $\pi/2$ rad, the error in the tilting angle can be compensated with a rotation around an axis which is mirrored in the TE-TM axis. This second rotation would be on a circle that crosses the TM-point. To achieve this, a second converter section is used in which the tilting angle is $-\Theta$, so the modes there are oppositely tilted. Exactly such a relation is obtained for two polarization converter sections which have mirrored cross-sections. Cross-sections of the two sections of such as device are illustrated in FIG. 9A, 9B. The device has an upper cladding layer 900, lower cladding layer 902, and core layer 904 sandwiched between them the two cladding layers. The core layer 904 has an index of refraction higher than that of the cladding layers 900 and 902, i.e., $n_{FILM} > n_{CLADDING}$ and $n_{FILM} > n_{SUBSTRATE}$. Such a mirrored cross section polarization converter leads to tilting angle of the modes with reversed sign.

Figure 10:
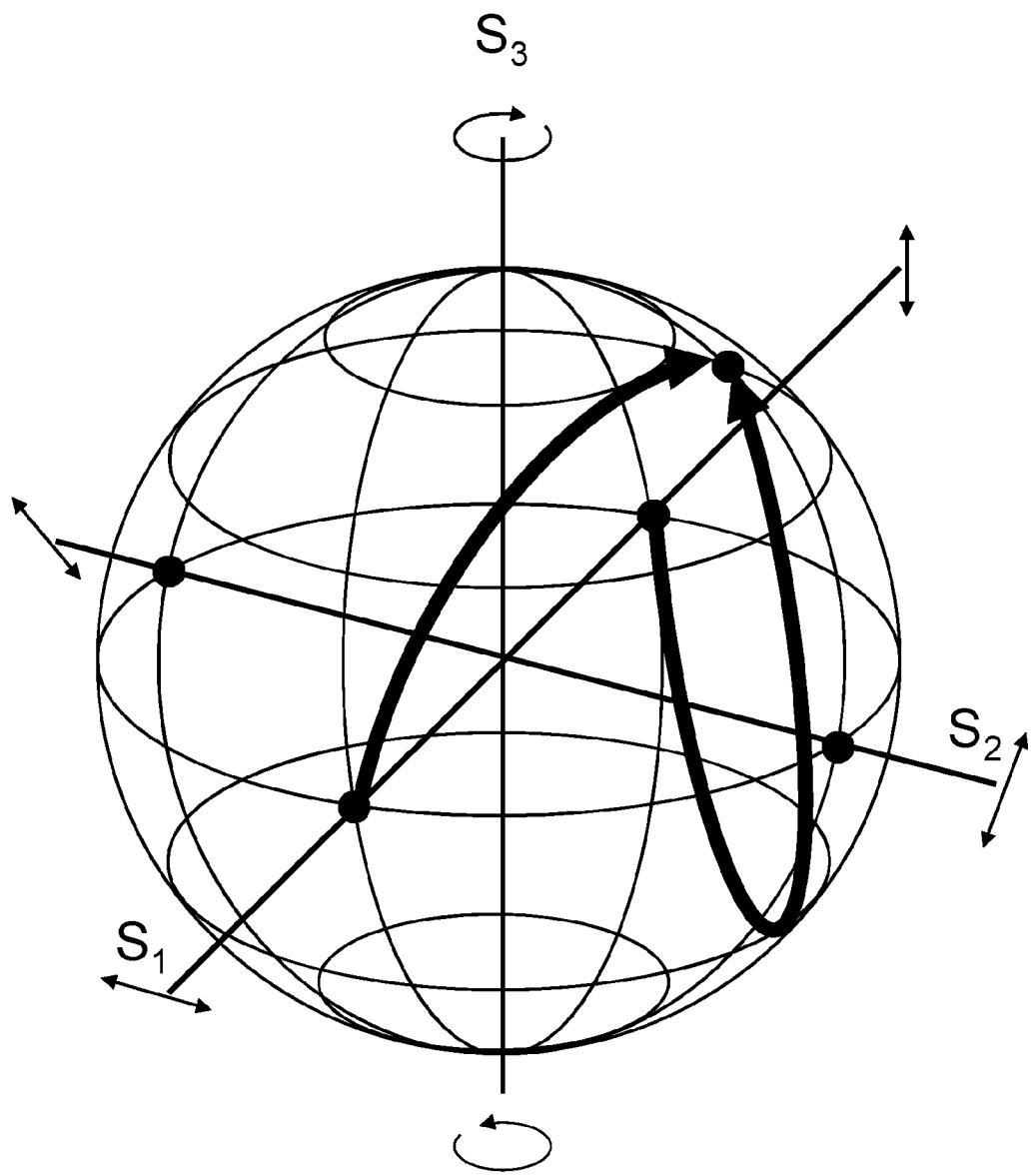
FIG. 10. Figure illustrating the trajectory of the SOP for conversion of TE to TM on the Poincaré sphere for the two section tolerant polarization converter.
Figure 11:
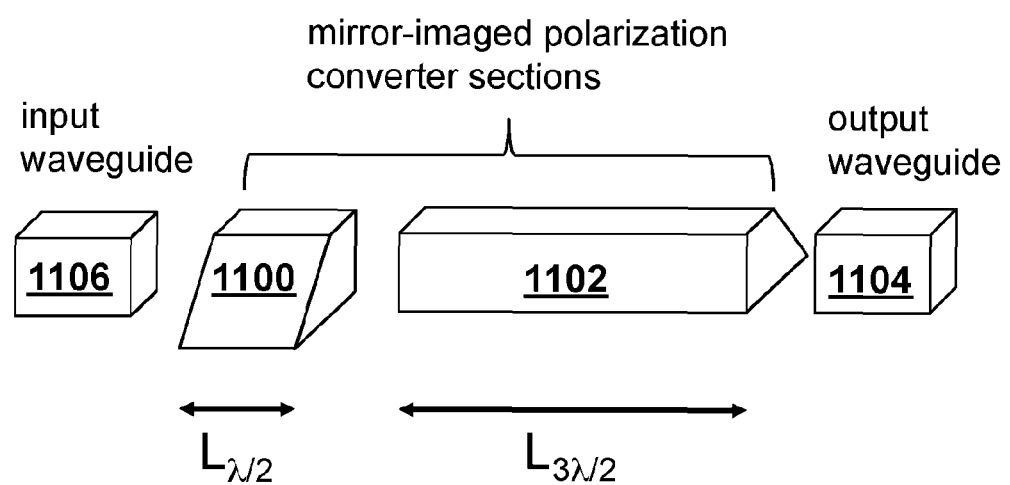
FIG. 11. Illustration of steps involved in the construction of a tolerant polarization converter. For clarity some space is left between the different sections, which in reality will not be there. Input and output waveguides, as well as the two mirrored converter sections, are shown.

In a practical realization it will be rather straight forward to obtain a mirrored cross section, as both sections may be simultaneously fabricated in the same material. Any deviation in width and material composition will therefore be the same in both sections. However, because of the mirroring the second section will give a rotation of the SOP over the surface of the Poincaré sphere in the opposite direction, a rotation angle of $3\pi/2$ rad is required to reach the TM-point. A tolerant polarization converter according to one embodiment of the invention thus comprises two sections of different length: one has a length $L_{\lambda/4}=\pi/2(\beta_1-\beta_2)$, while the other has a length which is thrice as long: $L_{3\lambda/4}=\pi/2(\beta_1-\beta_2)$. The total length of a device is thus twice the length of a single section device. FIG. 10 shows the total path of the SOP on the Poincaré sphere upon propagation through a device consisting of two mirrored sections with lengths adjusted to the required phase shifts. FIG. 11 shows the schematic structure of the two-section polarization converter design according to an embodiment of the invention, including mirrored polarization converter sections 1100 and 1102 positioned between input waveguide 1106 and output waveguide 1104.

For the tolerant polarization converter, having two sections, the conversion efficiency is given by $$C = [\sin^6\Theta\cos^2\Theta + \sin^2\Theta\cos^6\Theta] \quad (3)$$

$$\{6 + 4\cos(\varphi/2) - 4\cos(3\varphi/2) + 2\cos(2\varphi)\} +$$

$$\sin^4\Theta\cos^4\Theta\{-4 - 8\cos(\varphi/2) - 8\cos(\varphi) - 4\cos(2\varphi) + 8\cos(3\varphi/2)\}$$

Again, for an optimal converter, $\Theta=\pi/4$ and $\phi=\pi$. Performing a similar Taylor series expansion with deviations $\Delta\Theta$ and $\Delta\phi$ as before we can arrive at the change in C:

$$\Delta C = -0.25(\Delta\phi)^2 \quad (4)$$

Figure 12:
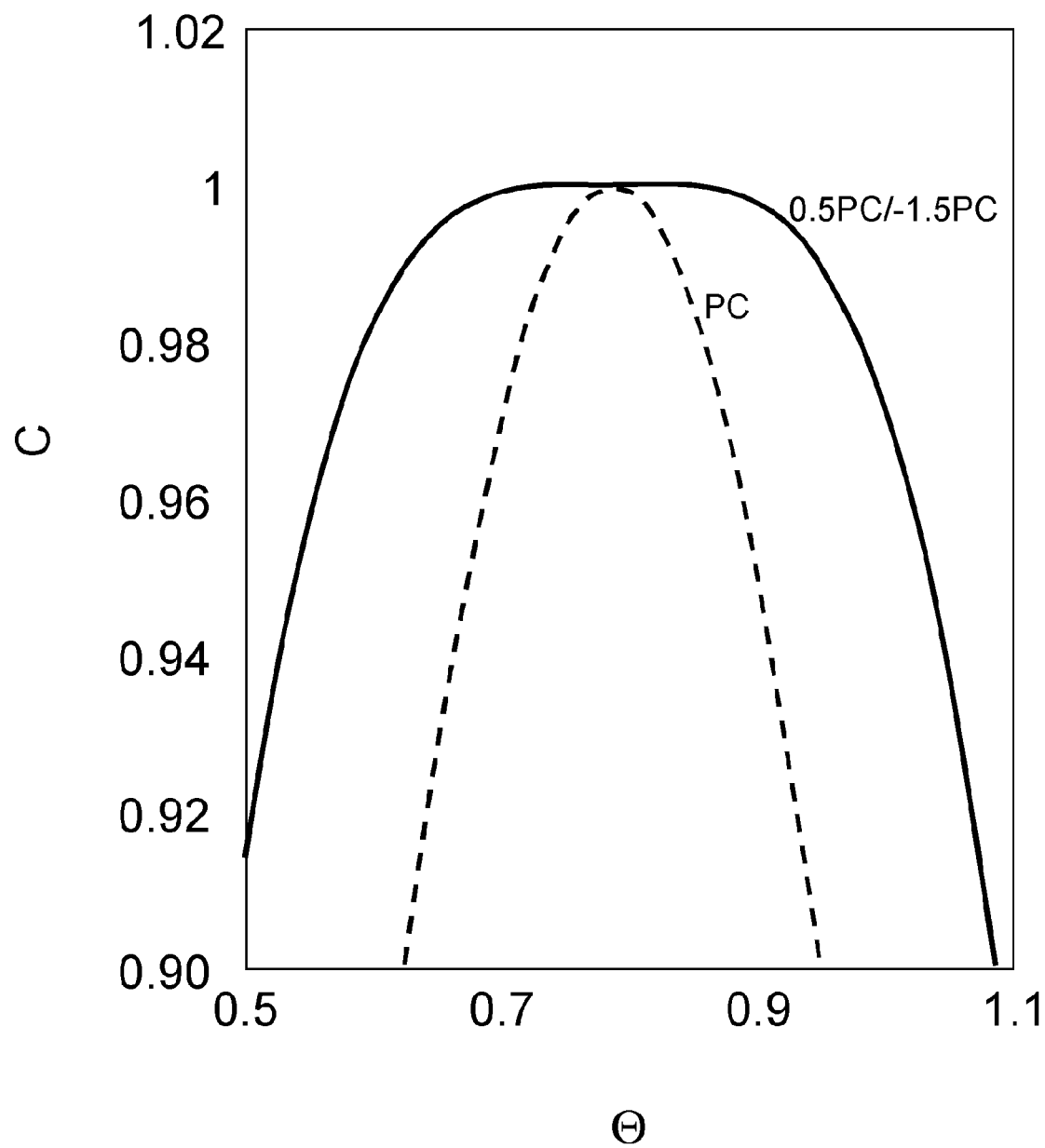
FIG. 12. Graph illustrating the conversion efficiency as a function of the tilting angle Θ, when the phase shift angle is π rad.

Eq. 4 shows that the error in $\Theta$ is compensated for up to second order, while only the much smaller error in $\phi$ remains. If we neglect the error in $\phi$ the dependence of the conversion efficiency as a function of $\Theta$ can be plotted (from Eqs. 1 and 3) for the original and for the tolerant version of the polarization converter, as shown in FIG. 12 which shows conversion efficiency as a function of the tilting angle $\Theta$, when the phase shift angle is $\pi$ rad.

These graphs reveal the origin of the tolerant behavior: for the two-section device a plateau appears around the optimal value, indicating that for relatively large deviations the error in tilting angle can be compensated. In order to investigate the tolerance of the new two-section devices, we simulate the effect of width deviations on the conversion of the device introduced in FIG. 5.

Figure 13:
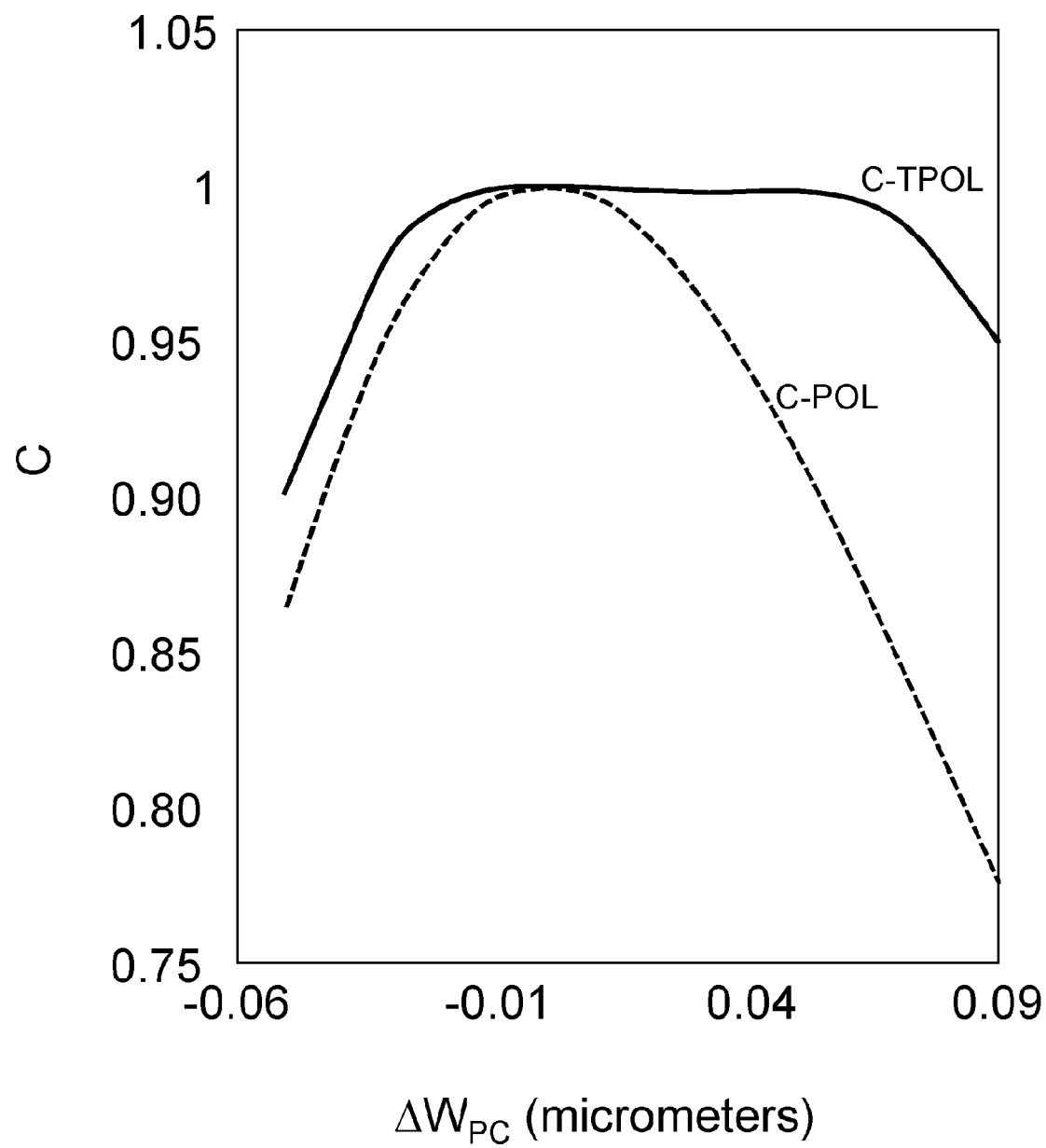
FIG. 13. Graph illustrating the dependence of conversion efficiency C as a function of width deviation $\Delta W_{PC}$ (in microns). C-POL refers to a single section polarization converter, C-TPOL to the tolerant two section device.

FIG. 13 shows the conversion for both a single and a two section polarization converter, illustrating the dependence of conversion efficiency C as a function of width deviation $\Delta W_{PC}$ (in microns). C-POL refers to a single section polarization converter, C-TPOL to the tolerant two section device. It is seen that for the two section device a plateau appears, indicating that there is a wide width range for which a very high conversion can be obtained. If a width range of 100 nm is considered, the single section device would have a conversion above 90%, but the two section device would show a conversion above 99% for this range. For some applications a 95% or higher conversion efficiency is needed, which can only be provided by the devices of the present invention. The figure shows that, as these conversion efficiencies, the width tolerance of the two-section polarization converter is doubled with respect to the single section converter.

The tolerance region is especially extended to the positive side, i.e., for wider converters, while for narrower converters the improvement is much smaller. The reason for this becomes clear when comparing with FIG. 7. For narrower converters the error in phase angle $\phi$ comes into play. As the tolerance improvement depends on compensating the tilting angle error $\Delta\Theta$, the region where $\Delta\phi$ has no influence (for wider converters) shows the best behavior. The designer can make use of this by designing the width of the two section polarization converter a bit larger, in order to aim for the middle of the plateau.

Figure 14:
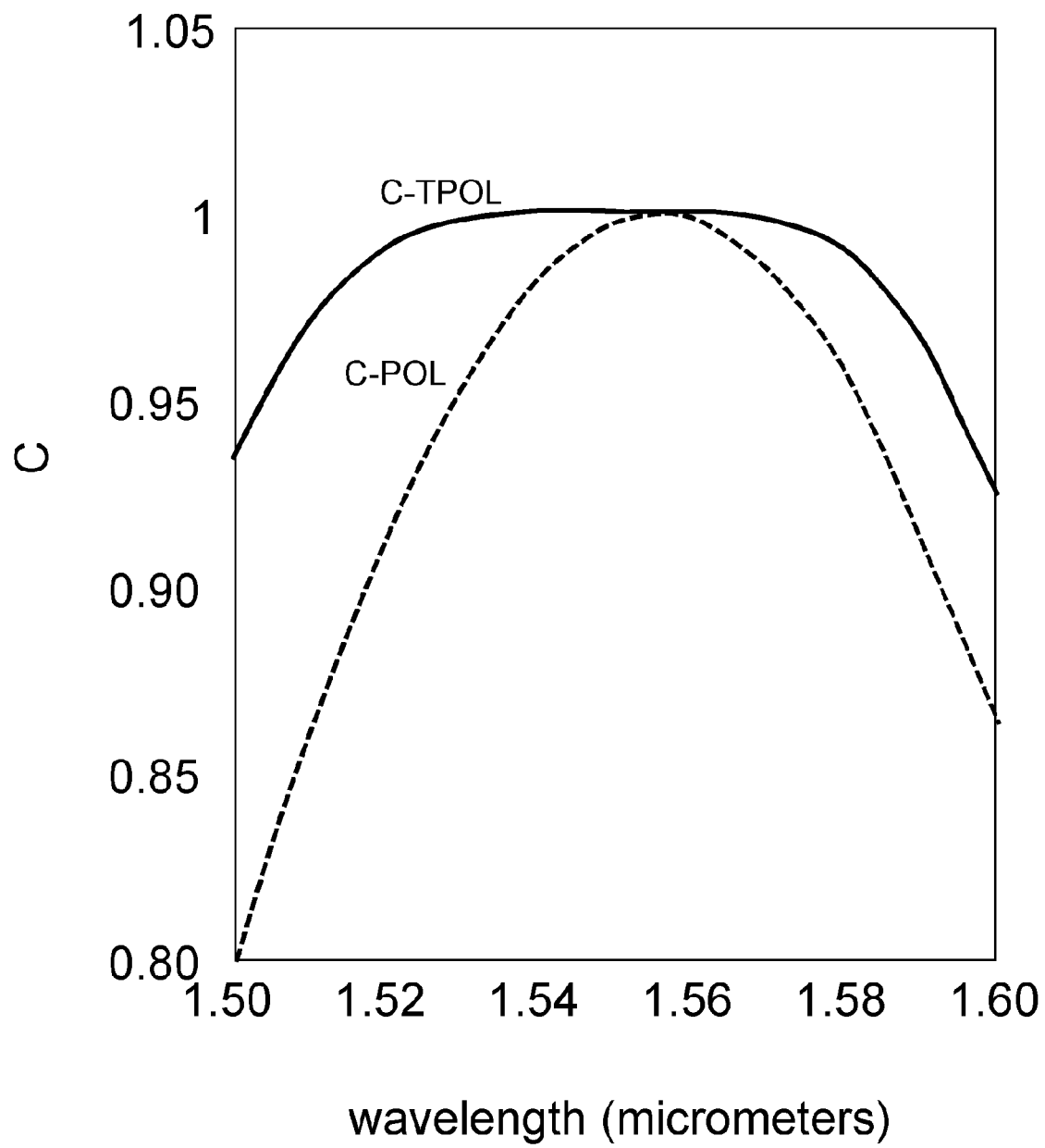
FIG. 14. Graph illustrating the wavelength dependence of the single and the two section devices. C-POL refers to the single section polarization converter, C-TPOL to the tolerant two section device.

The performance of the polarization converters is not only determined by fabrication errors, but also by deviations in the operational conditions from those assumed in the design. Therefore, the same ideas as used to improve fabrication tolerance can also be used to improve wavelength range or temperature range of operation. This is illustrated in FIG. 14 which shows the wavelength dependence of the single section and the two section devices.

Also in the wavelength dependence of the conversion efficiency of the two section polarization converter a plateau is obtained, indicating that here too a correction for the error in the tilting angle is present. The wavelength range for conversion efficiencies greater than 95% is almost doubled with respect to a single section device. For the important C-band the original polarization converter gives greater than 95% conversion, but the new tolerant device promises greater than 99%. This indicates that the performance of the converter improves dramatically, supporting applications in which polarization purity is important, like polarization multiplexing or polarization switching.

To summarize, the origin of the limited tolerances in the fabrication of single section sloped side polarization converters is identified to be the difficulty in maintaining a 45° tilting angle for the modes in the converter waveguide. A new polarization converter design is provided to correct for this error. It is a two section device, in which the two sections have modes with opposite tilting angles. The two sections are mirrored with respect to each other. This is easily achievable in fabrication. In a preferred embodiment, the two sections may be connected together as follows. The optimal connection allows for the maximum fraction of the light to be transferred from one section to the next. This implies that the gap between the sections is preferably less than 10% of the operational wavelength. Furthermore, in order that the two sections are properly aligned, they are preferably aligned in the same direction and positioned such that the centers of the waveguides (where the modes propagate) in the two sections are on a straight line.

The two mirrored sections are preferably realized simultaneously in the same fabrication process, using the same processing steps (like lithography and etching), so that any deviation following from those steps is identical in both sections. The mirroring itself can be obtained with the pattern definition in the lithography: the sloped side is made at opposite sides of the waveguide for the two sections. One technique, for sloped side walls, includes making a masking stripe for both sections together, then covering one side (say, the "south" side) of this stripe in the first section, and the other side (say, the "north" side) in the second section. Exposing this combined mask pattern to a chemical etching creates the sloped sidewalls, on opposite sides of the ridge, thereby creating the two mirrored cross sections needed.

The new two-section device shows much improved fabrication tolerances and wavelength range, and promises significantly higher conversion efficiencies. The tolerant polarization converter has a longer length than a conventional one-section device, and also includes one extra waveguide junction.

Figure 15:
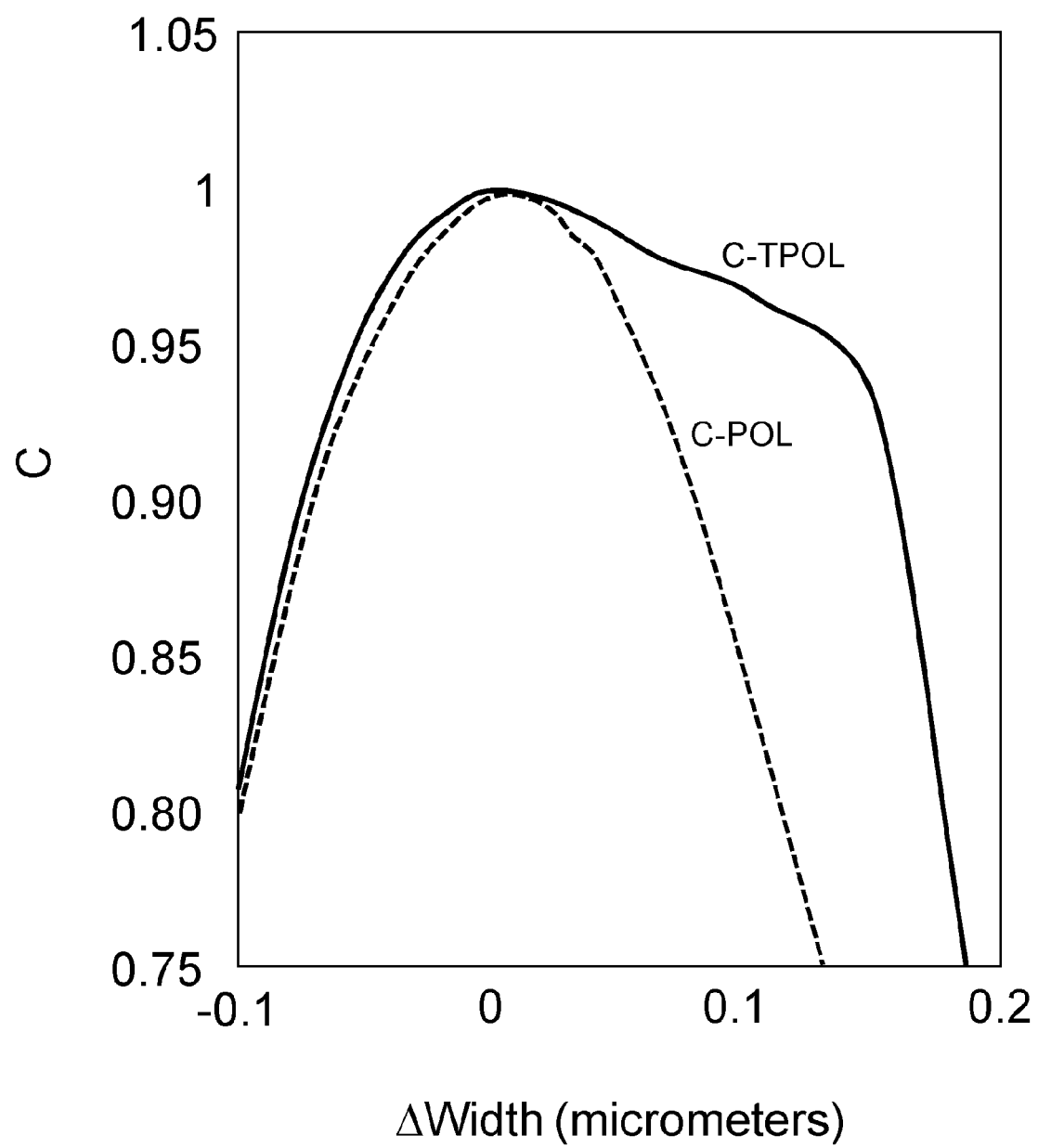
FIG. 15. Graph illustrating the polarization converter conversion vs. width behavior showing that a very high conversion (>0.99) over a large width variation is not obtained.
Figure 16:
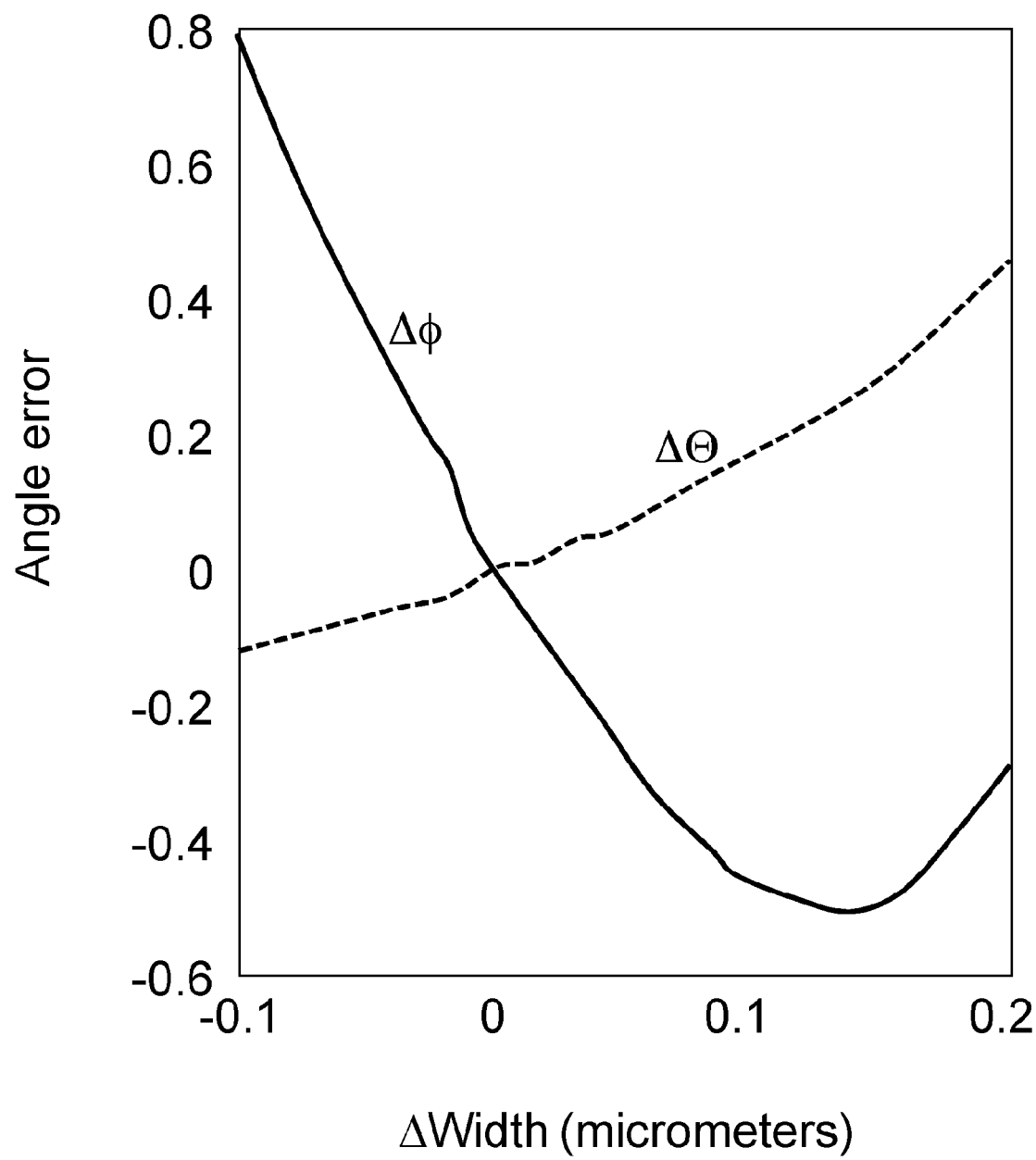
FIG. 16. Graph showing the reason for the behavior of FIG. 15 is the effect of the second error due to deviations: the phase angle between the tilted modes.
Figure 17:
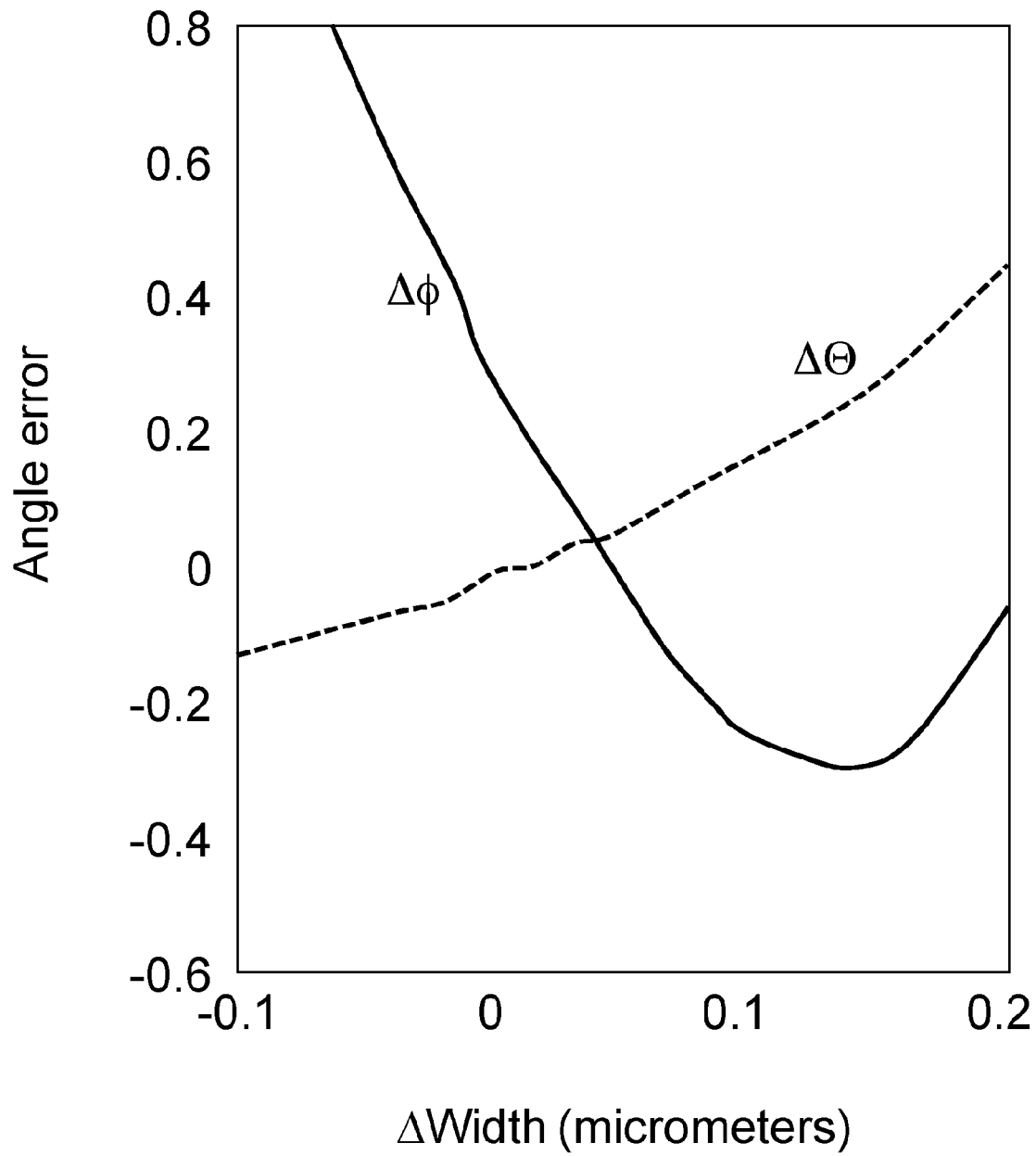
FIG. 17. Graph illustrating improved error curves when the lengths of the section are increased by 10%.
Figure 18:
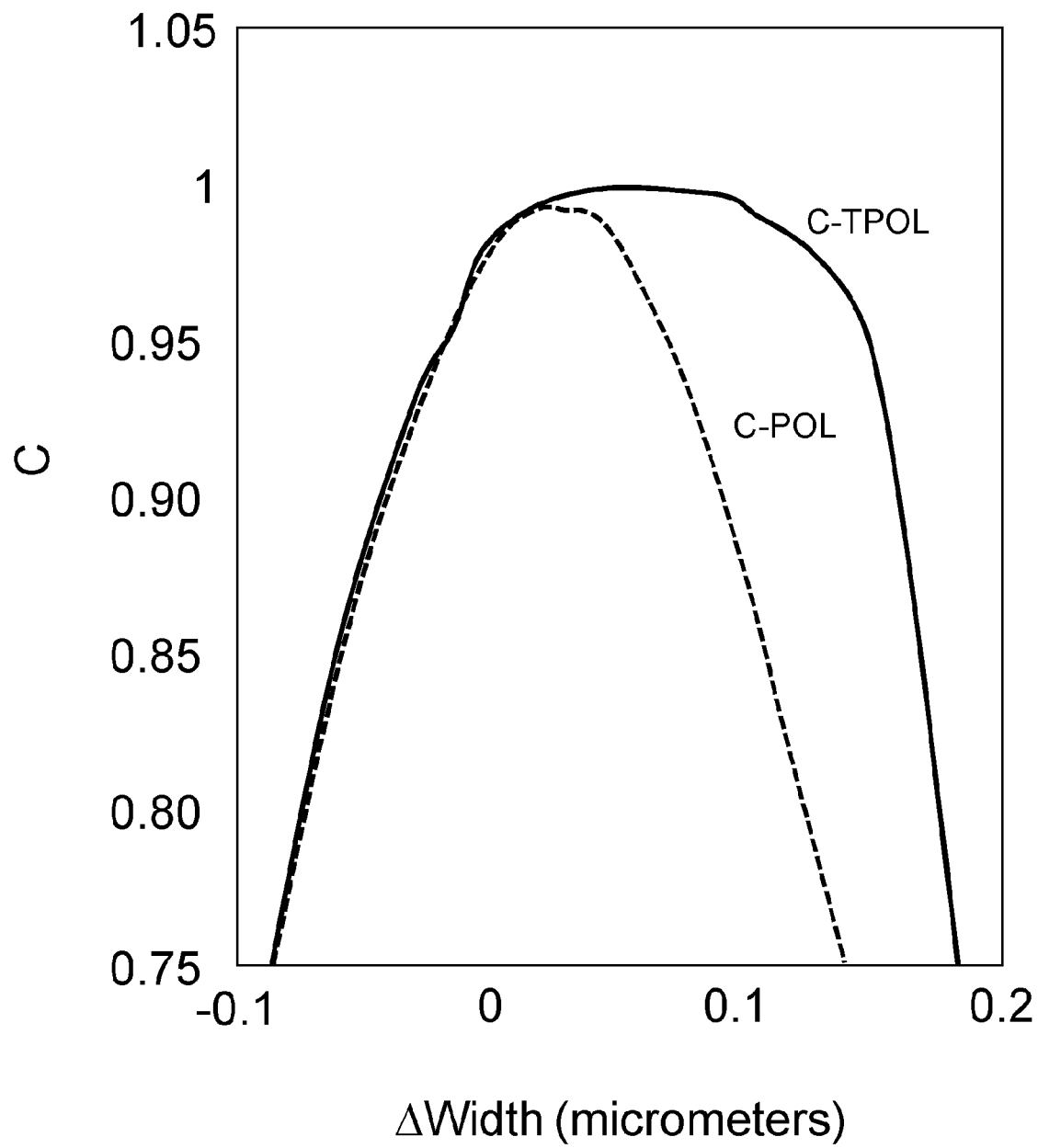
FIG. 18. A conversion-width graph with the lengths adjusted by 10%.

Additional embodiments of the invention are also provided which provides further improvements in certain cases. Specifically, consider the conversion vs. width behavior shown in FIG. 15 for one polarization converter according to the present invention. Here the blue curve relates to the original single section converter; the red one to the two section design of the present invention. Indeed, a plateau occurs, but the flat part of the red curve is not horizontal, but tilted. Thus the very high conversion (exceeding 0.99) is obtained, but not over a large width variation. The inventor has discovered that the reason for this departure from horizontal is the effect of the second error due to deviations: the phase angle between the tilted modes, as illustrated in FIG. 16. It is seen that in the region around the minimum of the phase angle error, which is the region where the plateau appears, the phase error $\Delta\phi$ is relatively large. Since its effect scales quadratic with its value, the impact is appreciable. This error can be reduced however, by increasing the length of the two sections by a predetermined factor. Consequently, the phase difference between the tilted modes increases, and since the phase error $\Delta\phi$ is negative, the absolute value of it decreases, thus reducing the effect on the conversion. For example, if we increase the lengths of the section by 10%, the error curves appear as shown in FIG. 17. It is seen that now there appears a phase error $\Delta\phi$ at the original design point ($\Delta$ Width=0). However, this phase error is relatively small. With these adjusted lengths the conversion-width graph is as shown in FIG. 18. Again a plateau appears, which is not around the original design point. The designer may accommodate this by aiming for a converter with an adjusted width.

So, if for a certain converter type the phase angle error around its minimum value is too large to obtain the desired horizontal plateau, a small correction to the length can be used to correct this. Specifically, if the phase error (which follows an inverted parabola as a function of fabrication or operational parameters) at the minimum is found to be $-\Delta\phi$ with respect to original design with lengths $L_1$ and $L_2$, then the polarization converter can be improved by using lengths of $L_1(1+\Delta\phi/2\pi)$ and $L_2(1+\Delta\phi/2\pi)$. In this way the maximum reduction of the conversion efficiency due to the phase error will be reduced by a factor of 4 in the useable tolerance region.

There following three cases may thus be considered for a requirement of at least x % conversion efficiency:

Case 1: $\Delta\phi<0.2(100-x)^{1/2}$ over the required tolerance range. No length adjustment is necessary, the original two-section design leads to a high performance device with wide tolerances.

Case 2: $0.2(100-x)^{1/2}<\Delta\phi<0.4(100-x)^{1/2}$ over the required tolerance range. With a length adjustment as described above, the two-section design leads to a high performance device with wide tolerances.

Case 3: $\Delta\phi>0.4(100-x)^{1/2}$ in the required tolerance range. The two-section design does not simultaneously provide both a high performance device and a wide tolerance range; there is then a tradeoff between conversion efficiency and tolerance range, which is a design choice dependent on a particular application.

In general, the value of $\Delta\phi$ should be no more than $0.4(100-x)^{1/2}$ for the length adjustment to be useful.

The invention claimed is:

1. An optical polarization converter device comprising:
   a first polarization converter section, and a second polarization converter section;
   wherein the first polarization converter section and second polarization converter section have mirror image cross-sections of each other;
   wherein the first polarization converter section and second polarization converter section are made of a common material and have orientation/tilt errors equal in magnitude and opposite in sign;
   wherein the first polarization converter section and second polarization converter section have lengths $L_1$ and $L_2$, respectively, where $L_1=(M+0.5)L_0$, $L_2=(N+0.5)L_0$, $|M-N|=2m+1$, for non-negative integers M,N,m, where $L_0$ is a constant length.

2. The device of claim 1 wherein the first polarization converter section and second polarization converter section have lengths in the ratio of 1:3, 3:5, or 5:7.

3. The device of claim 1 wherein a phase shift error $\Delta\phi$ between modes after propagation along the constant length $L_0$ is less than 0.2 radians.

4. The device of claim 1 wherein the first polarization converter section and second polarization converter section have lengths $L_1(1+\Delta\phi/2\pi)$ and $L_2(1+\Delta\phi/2\pi)$, respectively, respectively, where $L_1=(M+0.5)L_0$, $L_2=(N+0.5)L_0$, $|M-N|=2m+1$, for non-negative integers M,N,m, and where $\Delta\phi$ is a constant.

5. The device of claim 4 wherein $\Delta\phi$ is less than 0.4 radians.

6. The device of claim 4 wherein $\Delta\phi$ is less than 0.566 radians.

* * * * *